Patented Jan. 16, 1923.

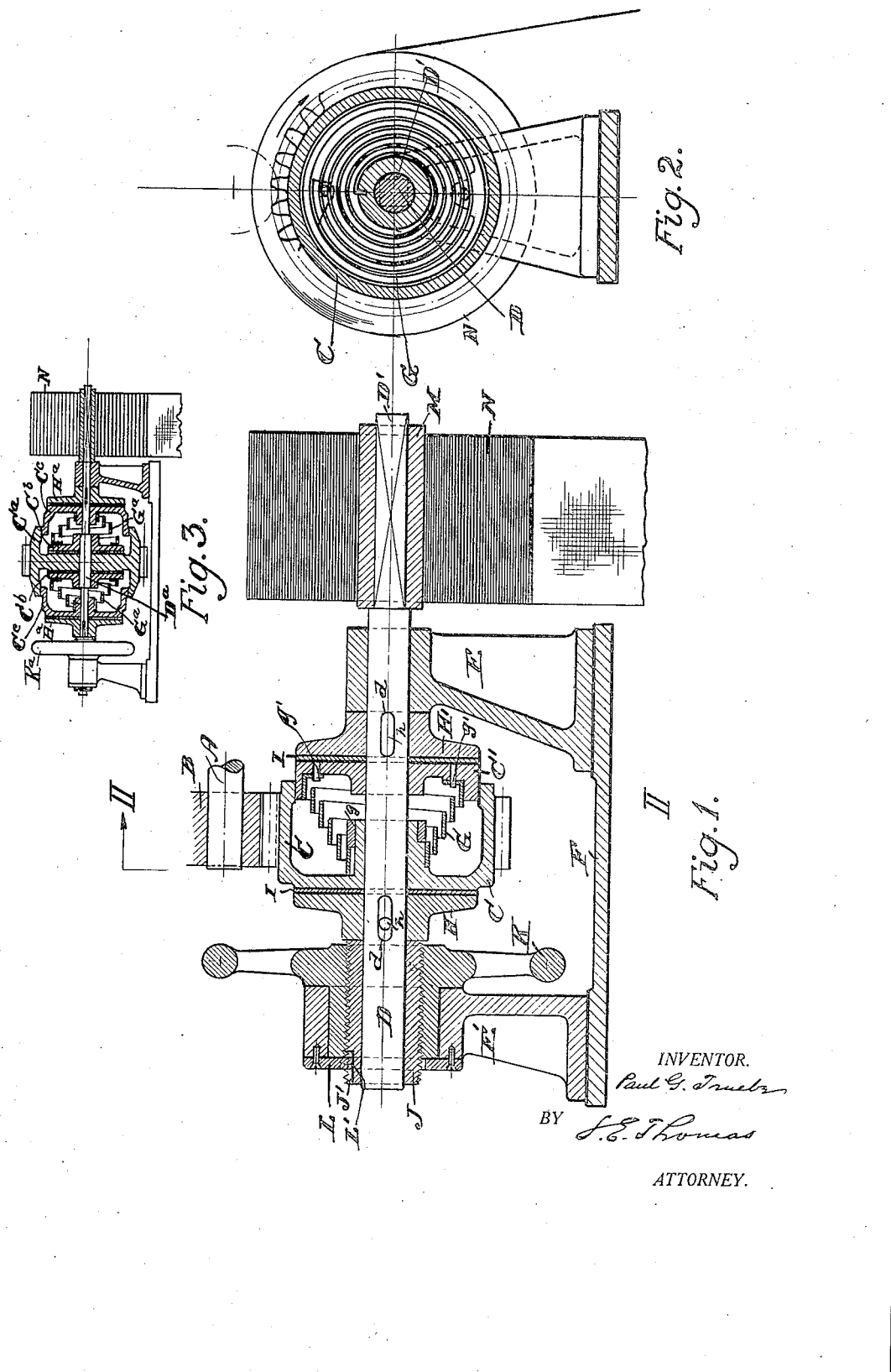

1,442,417

UNITED STATES PATENT OFFICE.

PAUL G. TRUEBE, OF DETROIT, MICHIGAN.

FRICTION CLUTCH AND TENSION DEVICE.

Application filed October 7, 1920. Serial No. 415,440.

*To all whom it may concern:*

Be it known that I, PAUL G. TRUEBE, citizen of Germany, residing at Detroit, county of Wayne, State of Michigan, have invented a certain new and useful Improvement in Friction Clutch and Tension Devices, and declare the following to be a full, clear, and exact description of the same, such as will enable others skilled in the art to which it pertains to make and use the same, reference being had to the accompanying drawings, which form a part of this specification.

My invention relates to a friction clutch or tension device adapted for installation in connection with mechanism operated under varying loads, as for example;—calendering machines for tire fabric, power washing machines, mangles, motor vehicles, etc., to insure a uniform driving tension which may be regulated to suit the load.

Among other objects the present invention is designed to provide a simple and inexpensive clutch or tension device which includes a conical, helical spring, located between spaced frictional driving and driven discs, to which the respective ends of the spring are secured by suitable engaging means;—the device being adapted for carrying a smaller or larger load as required, and so long as the force applied to the driving friction disc to drive the unit does not exceed the load the driving and driven frictional discs will be maintained at a certain distance from each other and both rotate with the same speed. If, however, the load should vary or in other words if the tension on the fabric being wound should become greater, due to the increasing diameter of the fabric upon the winding roll,—or from other causes,—the driven friction disc will slip, as a result of the spring being thereby wound, which thus shortens its length and being connected with the driving disc releases the latter from frictional driving relation with the driven disc until the load and the friction produced by the pressure of the spring are in equilibrium.

With the foregoing and other objects in view which will appear as the description proceeds the invention further consists in the combination and arrangement of parts and in the details of construction hereinafter described and claimed it being understood that changes may be made in the precise embodiment of the invention herein disclosed without departing from the spirit of the same.

In the drawings accompanying this specification:

Figure 1 is a diagrammatic,—and longitudinal, vertical sectional view of the device coupled to a shaft carrying a roll on which the fabric is wound.

Figure 2 is a cross-sectional view on line 2—2 of Figure 1.

Figure 3 is a diagrammatic and longitudinal vertical sectional view of a modification of the device.

Referring now to the letters of reference placed upon the drawings:

A, indicates a driving shaft, B, a driving pinion mounted on the shaft in mesh with a chambered frictional disc C, loosely mounted on a driven shaft D, the shaft D being suitably journaled in standards E and E' rising from the base plate F.

C', denotes a friction disc loose on the shaft D and having a projecting flange slidable within the chambered frictional disc C.

G, indicates a conical, helical spring having its inner or smaller convolution secured to the hub of the disc C, by a collar $g$, or other suitable device, and its outer or larger convolution suitably attached at one or more points $g'$ to the slidable disc C'.

H, and H', are friction-discs keyed to the shaft D to rotate the latter, the shaft being slotted as indicated at $d$ for the passage of the key $h$ to provide for a limited longitudinal movement of the disc H, thereon.

I, I, are leather washers secured to the respective friction discs.

J, is a screw threaded bushing through which the shaft D extends and on which is mounted the threaded hub of a hand-wheel K, journaled in the standard E'.

L, is an annular thrust-plate bolted to the end of the standard E' against which the hub of the hand-wheel K bears. The thrust-plate is provided with a projecting tongue L' extending into a keyway J' formed in the bushing J the purpose being to secure the bushing against rotation while permitting its longitudinal movement upon the shaft D through the rotation of the hand-wheel K;—the adjustment of which will serve to increase the friction between the driving and driven discs by the compression of the spring G.

M denotes a spool fitted to the squared end D' of the shaft D, to receive a ribbon of fabric N, being wound thereon.

In the modification shown in Figure 3 a double face driving disc $C^a$ is provided, against which are adapted to bear friction discs $C^b$, $C^b$, sleeved upon the shaft $D^a$. Projecting from the double face disc $C^a$ are annular flanges, within which are sleeved the friction driving discs $C^c$. $G^a$, $G^a$, indicates a pair of conical helical springs located respectively between each pair of discs $C^b$ and $C^c$,—the ends of the springs being secured in any suitable manner to each disc as previously described. $H^a$, $H^a$, are frictional driven discs keyed to the shaft $D^a$, and $K^a$ is a hand-wheel screwed upon a bushing (not shown) adapted to be shifted laterally upon the shaft $D^a$ into contact with the disc $H^a$ to adjust the compression of the springs $G^a$, $G^a$;—the construction and operation of the parts being similar to the corresponding parts shown in Figure 1 of the drawings.

Having now indicated the several parts by reference letters the construction and operation of the device will be readily understood.

Should the load under which the device operates suddenly increase from any cause, the conical helical spring will be forced to "wind" thereby reducing its length and thus separating the driving friction-discs from the driven friction-discs, whereby they may slip until a driving relation between the parts is again established by a proper adjustment of the driving power and load.

Having thus described my invention what I claim is:

1. In a device of the character described a shaft, a plurality of driving elements, loosely mounted on the shaft, a plurality of spaced driven elements on said shaft actuated through frictional contact with said driving elements, a helical spring connecting said driving elements together, whereby upon an undue increase in the load carried by the driving elements the same will be drawn toward each other by the winding action of said spring, thereby releasing said driving elements from frictional driving contact with the driven elements.

2. In a device of the character described, a pair of standards, a driven shaft journaled in the standards, spaced driving elements slidable on the shaft, a helical conical spring connection between and connecting said driving elements, spaced driven elements keyed on said shaft between which the said driven elements and said spring are located and which are driven through frictional engagement with said driving elements, and means for adjusting the degree of frictional engagement of the driving elements with relation to the driven elements.

3. In a device of the character described, a pair of standards, a driven shaft journaled in the standards, spaced driving elements slidable on the shaft, a helical conical spring connection between and connecting said driving elements, spaced driven elements keyed on said shaft between which the said driven elements and said spring are located and which are driven through frictional engagement with said driving elements, an exteriorly screw threaded bushing on said shaft, and a hand wheel having a threaded hub for working fit on the threads of said bushing whereby to adjust the degree of frictional engagement of the driving elements with relation to the driven elements.

4. In a device of the character described, a pair of standards, a driven shaft journaled in the standards, spaced driving elements slidable on the shaft, a helical conical spring connection between and connecting said driving elements, spaced driven elements keyed on said shaft between which the said driven elements and said spring are located and which are driven through frictional engagement with said driving elements, an exteriorly screw threaded bushing on said shaft, a hand wheel having a threaded hub for working fit on the threads of said bushing, said bushing having a groove therein, a thrust plate secured to one of said standards and having a tongue fitted in said groove of the bushing to secure the bushing against rotation and yet permit longitudinal movement of the bushing on said shaft upon rotation of said hand wheel so as to adjust the degree of frictional contact between the said driving and driven elements.

5. In a device of the character described, a driven shaft, a frictional driving element loosely mounted on the shaft provided with gear teeth and having an annular flange, a drive shaft, a driving pinion keyed to the drive shaft in mesh with the teeth of the frictional driving element, a yieldable frictional driving disc loosely mounted upon the driven shaft adapted to telescope with the frictional driving element, frictional driven discs keyed to the driven shaft adapted to be brought into impinging relation with the disc of the frictional driving element, means for adjusting said frictional driven discs, and a helical conical spring located between the frictional driving element and the yieldable frictional driving disc, as and for the purpose described.

6. In a device of the character described, a drive shaft, a pinion keyed to the drive shaft, a driven shaft suitably journaled, a frictional driving element loosely mounted upon the driven shaft and geared to the driving pinion, a yieldable frictional driving element loosely mounted upon the driven shaft and adapted to telescope with the first named frictional driving element, frictional driven discs keyed to the driven shaft adapted for adjustment into impinging relation with the frictional driving elements, a helical conical spring between the frictional driving elements, a threaded bushing sleeved on the driven shaft, an adjustable hand-wheel screwed upon the bushing adapted when adjusted to move said bushing laterally into abutting relation with the frictional driving discs, whereby the tension of the helical conical spring may be regulated.

7. In a device of the character described, a rotatably mounted shaft, a pair of driving elements having telescoping relation and loosely mounted on said shaft, a driven element keyed on said shaft and having frictional contact with one of the driving elements, and a spring connecting said driving elements to normally maintain one of said driving elements in frictional driving contact with said driven element, whereby upon an undue increase in the load carried by the driving elements, the same will be drawn toward each other by the winding action of said spring to thereby release the driving connection between the driving and driven elements and whereby the pressure against the driven element varies as the load changes.

8. In a device of the character described, a rotatable shaft, a pair of spaced driving elements loosely mounted on the shaft, a plurality of driven elements keyed on said shaft and actuated through frictional contact with said driving elements to rotate said shaft, a spring connecting the driving elements together, whereby upon an undue increase in the load carried by the driving elements the driving elements will be drawn toward each other by a winding action of said spring, thereby releasing said driving elements from frictional driving contact with the driven elements and whereby the frictional pressure against the driven elements varies as the load changes.

9. In a device of the character described, a rotatable shaft, a pair of spaced driving elements loosely mounted on the shaft, a pair of driven elements keyed on the shaft and between which said driving elements are arranged and with which they have frictional contact, a spring connecting said driving elements together, said driving elements being formed to enclose the spring within them, and means for applying motion to the driving elements to rotate said shaft through the frictional contact of the driving members with the driven members and whereby upon an undue increase in the load carried by the driving elements the same will be drawn toward each other by a winding action of said spring, thereby releasing said driving elements from frictional driving contact with the driven elements and whereby the pressure against the driven elements varies as the load changes.

In testimony whereof, I sign this specification in the presence of two witnesses.

PAUL G. TRUEBE.

Witnesses:
S. E. THOMAS,
MAURICE WOLF.